(12) United States Patent
Mintchev et al.

(10) Patent No.: US 9,446,845 B2
(45) Date of Patent: Sep. 20, 2016

(54) FOLDABLE AND SELF-DEPLOYABLE AERIAL VEHICLE

(71) Applicant: Ecole Polytechnique Federale De Lausanne (EPFL), Lausanne (CH)

(72) Inventors: Stefano Mintchev, Lausanne (CH); Ludovic Daler, Lausanne (CH); Dario Floreano, St-Prex (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 146 days.

(21) Appl. No.: 14/528,024

(22) Filed: Oct. 30, 2014

(65) Prior Publication Data

US 2016/0122016 A1 May 5, 2016

(51) Int. Cl.
*B64C 27/08* (2006.01)
*B64C 39/02* (2006.01)

(52) U.S. Cl.
CPC ....... *B64C 39/024* (2013.01); *B64C 2201/024* (2013.01); *B64C 2201/102* (2013.01); *B64C 2201/108* (2013.01)

(58) Field of Classification Search
CPC .................. B64C 2201/024; B64C 2201/102; B64C 2201/108; B64C 39/024; A63H 27/00; A63H 27/007
See application file for complete search history.

(56) References Cited

U.S. PATENT DOCUMENTS

| 3,053,480 | A | * | 9/1962 | Vanderlip | B64C 27/54 244/17.13 |
| 8,052,081 | B2 | * | 11/2011 | Olm | B64C 1/30 244/17.23 |
| 8,453,962 | B2 | * | 6/2013 | Shaw | B64C 27/20 244/12.4 |
| 2015/0259066 | A1 | * | 9/2015 | Johannesson | B64C 27/08 244/17.27 |
| 2015/0321755 | A1 | * | 11/2015 | Martin | B64C 27/50 244/17.23 |
| 2016/0114887 | A1 | * | 4/2016 | Zhou | B64C 39/024 348/148 |

FOREIGN PATENT DOCUMENTS

CN 101973392 A 2/2011
FR 2909972 A1 * 6/2008 ............. A63H 27/12

OTHER PUBLICATIONS

International Search Report for PCT/EP2015/075234.

* cited by examiner

*Primary Examiner* — Philip J Bonzell
(74) *Attorney, Agent, or Firm* — Seyfarth Shaw LLP; Brian Michaelis

(57) ABSTRACT

An aerial vehicle including self-autonomous deployable arms and methods of deploying the vehicle are disclosed. The arms may include patterns located thereon that allow the arms to transition between wrapped, flat, and deployed configurations autonomously without the need for direct intervention by a user.

20 Claims, 11 Drawing Sheets

FOLDABLE AND SELF-DEPLOYABLE AERIAL VEHICLE

FIELD

The systems and methods disclosed herein relate generally to an aerial vehicle and, more particularly, to an aerial vehicle having folding and self-deployment capabilities.

BACKGROUND

Generally, aerial vehicles are used in various high-risk scenarios due to their capability to quickly fly in remote, dangerous, and even inaccessible areas, thereby providing useful information to users. These aerial vehicles serve various functions, including reconnaissance, mapping, inspection of partially collapsed structures, and victim localization.

These beneficial functions are better served by aerial vehicles that are easy to transport to a mission area. One postulated solution to improve portability is to make a "pocket sized" (e.g. small, light-weight, and readily carried and deployable by a person) aerial vehicle. This solution includes reducing the size of the propellers of the aerial vehicle, however this produces insufficient thrust to carry any useful payload, such as a camera. Additionally, reconfigurable beams or detachable appendages have also been utilized. However these often require a user to manually connect the system parts to create a deployable state, potentially resulting in human user errors. Manual connection/assembly also requires additional time, which increases proportionally with the number of aerial vehicles to be deployed, thereby limiting the magnitude of aerial vehicle dispersal. Further, when passively actuated (e.g., elastically), the unfolding of the beams is irreversible, thereby requiring a user to fold the arms after use.

SUMMARY

The present disclosure describes an aerial vehicle that is simple to manufacture, lightweight, cost effective, easy to transport, and capable of rapid autonomous self-deployment. According to an aspect of the present disclosure, an aerial vehicle may include a main frame and arms attached to the main frame having wrapped, flat, and deployed configurations. Motors may also be attached to the arms and propellers may be in working communication with the motors. Further, torque generated by the propellers may transition the arms from the wrapped configuration to the flat configuration. Magnets or other actuation takes the arms from the flat configuration to the deployed configuration, making the vehicle ready for aerial flight.

According to an embodiment, each arm may include at least one fold line, such as a vertical and/or horizontal fold line, where the arm structure may be folded, collapsed or drawn together upon itself. In one embodiment, each arm may include two vertical fold lines. In another embodiment, each arm may be folded along each of the two vertical fold lines while the arm is in the wrapped configuration. Each arm may include a horizontal fold line. Magnets may be attached to each arm, thereby providing a torque that transitions the arms from the unwrapped, flat configuration to the deployed configuration. According to a further embodiment, each arm may include two substantially perpendicular portions, in an "L" shape, while in the deployed configuration.

According to another aspect of the present disclosure, an aerial vehicle may include a main frame and four arms attached to corners of the main frame. The four arms may include motors attached to the arms and propellers attached to the motors that generate torque to transition the arms from the wrapped configuration to the flat configuration. The aerial vehicle may further include magnets attached to the main frame and the four arms. Magnets may hold the four arms proximate to the main frame while the four arms are in the wrapped configuration.

According to multiple embodiments of the present disclosure, the four arms may include at least one fold line in parallel with an axis of the propellers and at least one fold line substantially perpendicular with the axis of the propellers. Further magnets may be attached to each arm and the main frame, wherein the magnets hold the arm in the unwrapped and deployed configuration.

According to yet a further aspect of the present disclosure, a method of deploying an aerial vehicle may include activating motors located on arms of the aerial vehicle, generating torque through propellers by rotating the propellers in a first direction, detecting when the arms have achieved an unwrapped, deployed configuration, and inverting a rotation of the propellers thereby causing the propellers to rotate in a second direction.

According to multiple embodiments of the present disclosure, the first direction may be a counterclockwise direction and the second direction may be a clockwise direction. In a further embodiment, detecting when the arms have achieved the deployed configuration may include the use of switches or sensors. The use of switches may include detecting when the switches are in a closed position. Inverting the rotation of the propellers may include receiving a signal that indicates the switches are in the closed position. The detecting of whether the arms have achieved the folded configuration may occur on an individual arm basis and the inverting of the rotation of the propellers may occur on an individual propeller basis.

BRIEF DESCRIPTION OF THE DRAWINGS

The present disclosure is illustrated in the figures of the accompanying drawings which are meant to be illustrative and not limiting, in which like references are intended to refer to like or corresponding parts, and in which.

DETAILED DESCRIPTION

Detailed embodiments of the systems and methods are disclosed herein, however, it is to be understood that the disclosed embodiments are merely illustrative of the systems and methods, which may be embodied in various forms. Therefore, specific functional details disclosed herein are not to be interpreted as limiting, but merely as a basis for the claims and as a representative basis for teaching one skilled in the art to variously employ the systems and methods disclosed herein.

According to various aspects of the present disclosure, an aerial vehicle utilizing foldable origami techniques to allow the aerial vehicle to fit within a user's pocket when "wrapped" (i.e. folded and compacted) is described. The aerial vehicle may have a transportation configuration wherein arms of the aerial vehicle are wrapped around a main frame. The arms may self-deploy into a ready to fly or deployed configuration due to torque generated by propellers located on the arms. Such self-deployment of the arms may occur in a minimal amount of time, such as 0.3 seconds, for example. The arms may be manufactured according to an origami technique with a foldable multi-layer material, as described hereinafter.

Stiffness of the unwrapped and deployed arms of the aerial vehicle ensure maneuverability of the aerial vehicle. If the arms are too flexible, they could bend and vibrate when the propellers are turning, causing instability during flight and reducing the reaction time of the aerial vehicle to external commands. On the other hand, the arms should include a compliant configuration in order to be able to fold the arm with minimal effort. The disclosed arm herein provides a fold pattern that achieves both rigidity (in the deployed configuration) and compliance in the wrapped and flat configurations in order to easily transition between multiple configurations.

Figure 1A:
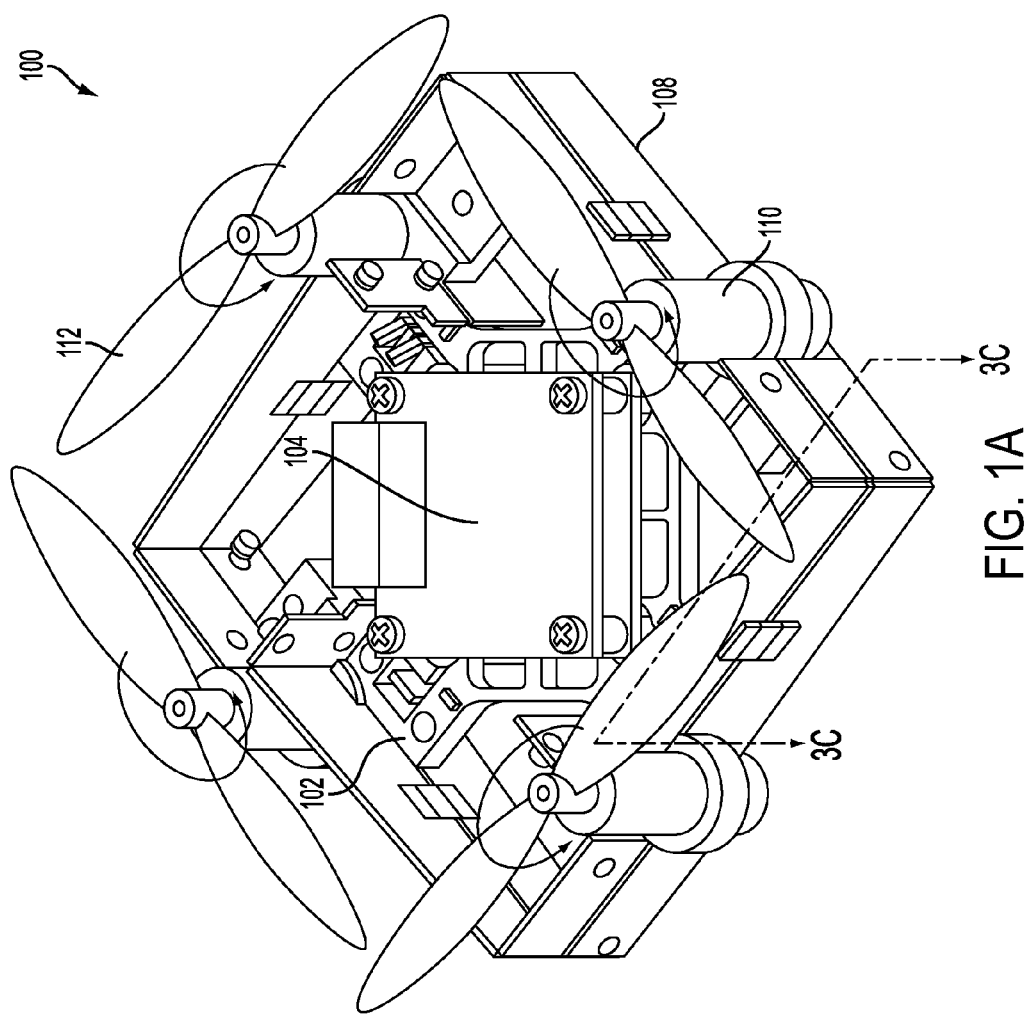
FIG. 1A illustrates a wrapped configuration of an aerial vehicle according to various embodiments of the present disclosure.
Figure 1B:
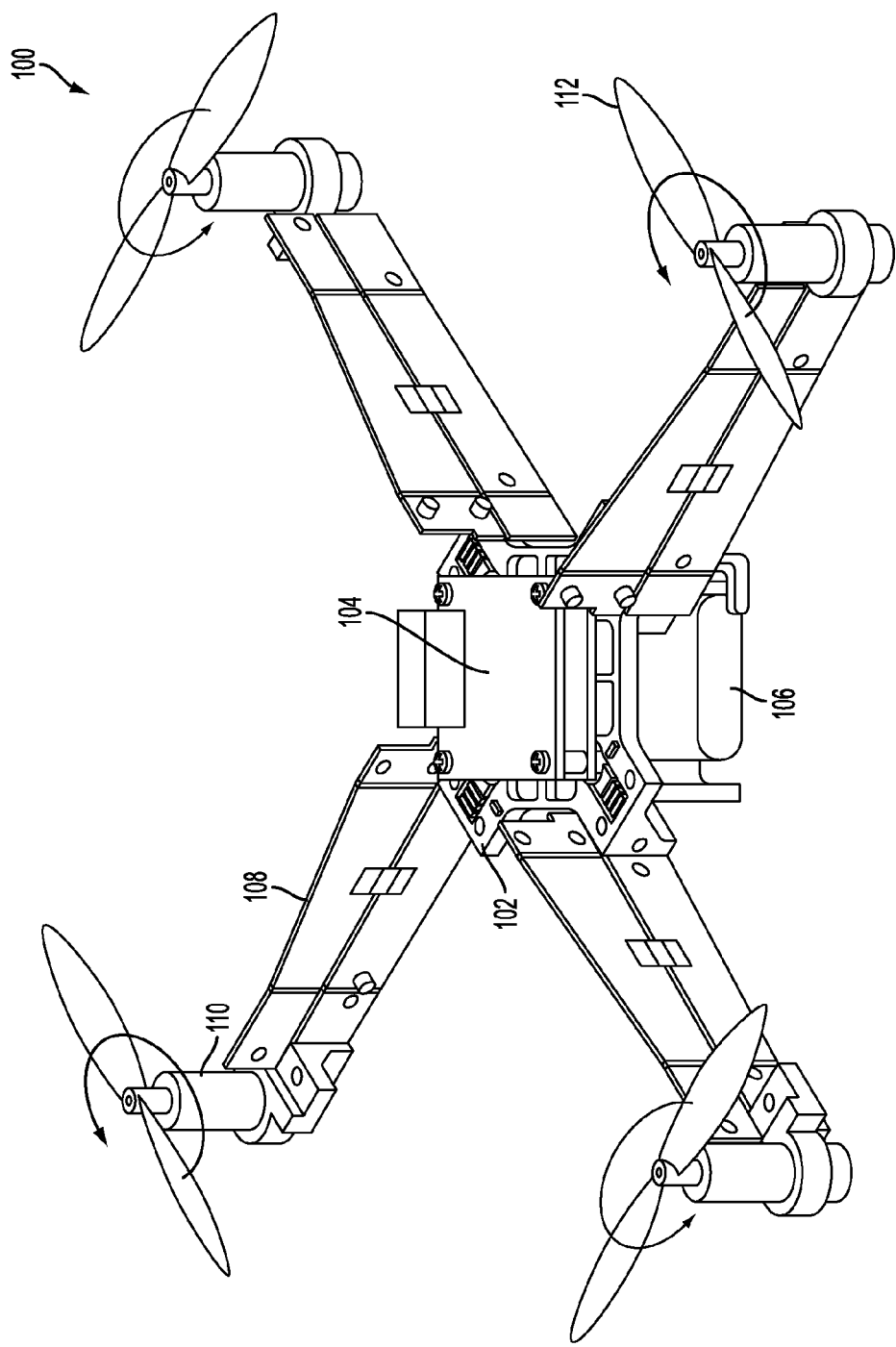
FIG. 1B illustrates an unwrapped configuration of an aerial vehicle according to various embodiments of the present disclosure.
Figure 1C:
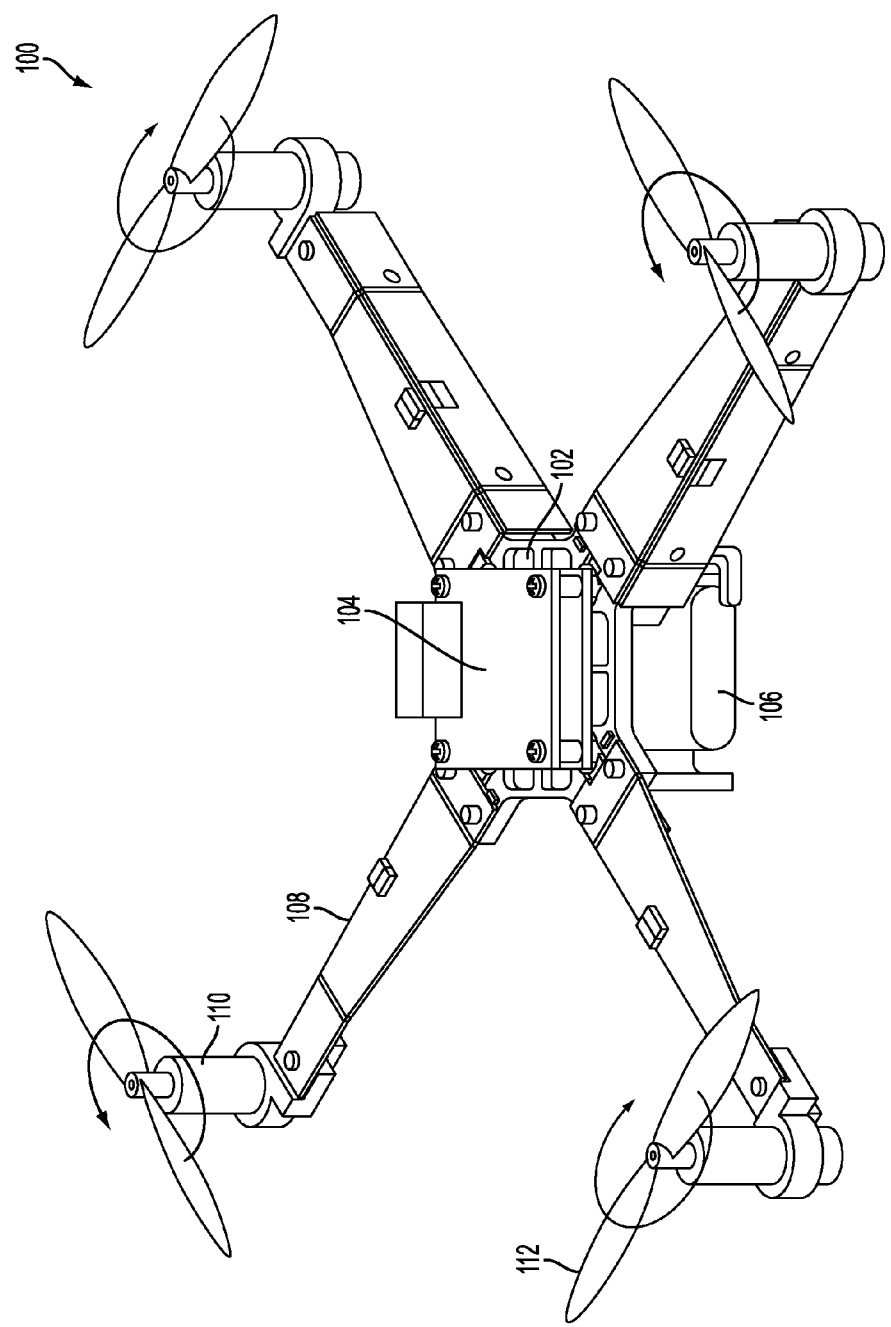
FIG. 1C illustrates an unwrapped and deployed configuration of an aerial vehicle according to various embodiments of the present disclosure.

According to an aspect of the present disclosure, an aerial vehicle 100 is described with reference to FIGS. 1A-1C. The aerial vehicle 100 may include a main frame 102, a control board 104, a battery 106, arms 108, motors 110, and propellers 112.

The main frame 102 may be centrally located within the aerial vehicle 100 and may house the control board 104 and the battery 106. Optionally, the main frame 102 may further house a board and switches (illustrated and described in detail hereinafter with respect to FIGS. 3B) that control rotation directions of the motors 110. The main frame 102 may have any shape and may be 3D printed or manufactured with origami techniques. Additionally, the main frame 102 may have integrated magnets (illustrated and described in detail hereinafter with respect to FIGS. 3A-3C), that maintain the arms 106 in a wrapped configuration until a deployment process of the aerial vehicle 100 is initiated.

The control board 104 may be located on or within the main frame 102. The control board 104 may be configured to receive a communication or signal from a user and to transmit the communication or signal to various parts of the aerial vehicle 100. Such receipt of a communication from a user may occur through various means, including wireless and Bluetooth, for example. Transmission of communications throughout the aerial vehicle 100 may occur through various means, including, wired, wireless, and Bluetooth, for example.

The battery 106 may be removably attached to or housed within the main frame 102. The battery 106 may be of any size sufficient to fit on or within the main frame 102 and may produce any voltage sufficient to provide adequate power to the various components of the aerial vehicle 100.

The arms 108 may be removably or permanently attached to the main frame 102 at attachment ends of the arms 108. Each arm 108 may be comprised of a layer of fiberglass and an underlying layer of Icarex, a ripstop Polyester fabric, available from TopFabric (Scheepmakersstraat 87 2515 VB The Hague, The Netherlands), or any other lightweight and inextensible fabric. The arm 108 may be produced from a 2D shape and may include gluing the fiberglass layer, using cyanoacrylate, to the underlying layer of Icarex. The resulting 2D structure may be cut using, for example, a $CO_2$ laser cutter. A crease pattern may also be engraved in the fiberglass layer. The engraved arm 108 may then be folded along the engravings, resulting in the fiberglass layer breaking along the engravings while the Icarex keeps the multiple pieces of the fiberglass layer together. This procedure produces unidirectional folds that constrain the rotation of the arm 108. It should be appreciated that other laminar structures may be implemented to effect creases or fold lines. Alternatively, approaches to building structures as disclosed may include 3D printed multi-materials having joints (folds) printed in flexible material, that is embedded in a rigid material composing the arm 108. Furthermore, the arms 108 and the main frame 102 may be manufactured as a single part using origami techniques, which are then folded.

The arm 108 may have wrapped, flat, and deployed configurations. The wrapped configuration, wherein the structure is folded along the fold lines (illustrated in FIG. 2A discussed hereinafter), may generally be utilized during transportation of the aerial vehicle 100 and the deployed configuration used during operation/flight of the aerial vehicle 100.

The wrapped configuration may entail the arms 108 wrapping around the main frame 102. In an embodiment, each arm 108 may horizontally wrap around the main frame 102 in plane with the other arms 108. In yet another embodiment, one end of an arm 108 may abut or attach to an end of another arm 108. For example, a propeller end of one arm 108 may wrap into an attachment end of another arm 108. Further, when wrapped, each arm 108 may contain one or more perpendicular or substantially perpendicular bends in the arm 108, located along vertical fold lines. According to an embodiment, the arms 108 may be wrapped around the main frame 102 in a manner allowing for unwrapping of the arms 108 using torque generated by the propellers 112. This may be more easily achieved when unwrapping of the arms 108 is not performed against gravity.

The flat and deployed configurations may entail the arms 108 extending outwardly from a central point located within the main frame 102. In the flat configuration, each arm 108 may extend along a single plane (e.g., a vertical plane). This flat configuration may be a result of the propeller 112 generating torque, thereby causing the arm 108 to unwrap along vertical fold lines in the arm 108, which are parallel to an axis of the propeller 112. The propeller 112 axis extends perpendicular to a plane that extends along blades of the propeller 112. In the deployed configuration (i.e., flying configuration), each arm 108 may fold along a horizontal fold line (206, best illustrated in FIG. 2C and discussed hereinafter) thereby producing two portions that extend outward from the central point of the main frame 102 along two planar axis (i.e., a horizontal or substantially horizontal portion and a vertical or substantially vertical portion). The horizontal fold line may be oriented substantially perpendicular to the propeller's 112 axis.

The motors 110 may be removably and/or permanently attached to the arms 108, proximate the propellers 112. In an embodiment, one motor 110 is located on each arm 108, resulting in one motor 110 driving a single propeller 112 (or multiple propellers). However, it should be appreciated that multiple motors 110 may be located on a single arm 108, thereby resulting in multiple motors 110 driving a single propeller 112 (or multiple propellers), without departing from the scope of the present disclosure.

The propellers 112 may be removably and/or permanently attached to the arms 108 and/or the motors 110. According to embodiments, the propellers 112 may be attached to the arms 108 and/or motors 110 proximate or at ends of the arms 108, distal from the main frame 102 when the arms 108 are in the flat or deployed configurations. Each propeller 112 may be in communication with one or more motors 110, which drive the propellers 112. Rotations of and torque generated by the propellers 112 may be used to unwrap the arms 108 (and by opposite rotation wrap the arms). For example, the arms 108 may be unwrapped when the propellers 112 generate a certain torque (i.e., clockwise or counterclockwise depending on arm's wrapping direction). In other words, fold lines in the arm 108 parallel to the propeller's 112 axis (i.e., vertical fold lines in the arm) are suited for a deployment driven by torque generated by the propeller 112. However, it should be appreciated that the arms 108 may also be wrapped by rotations of and torque generated by the propellers 112 without departing from the scope of the present disclosure.

Figure 2A:
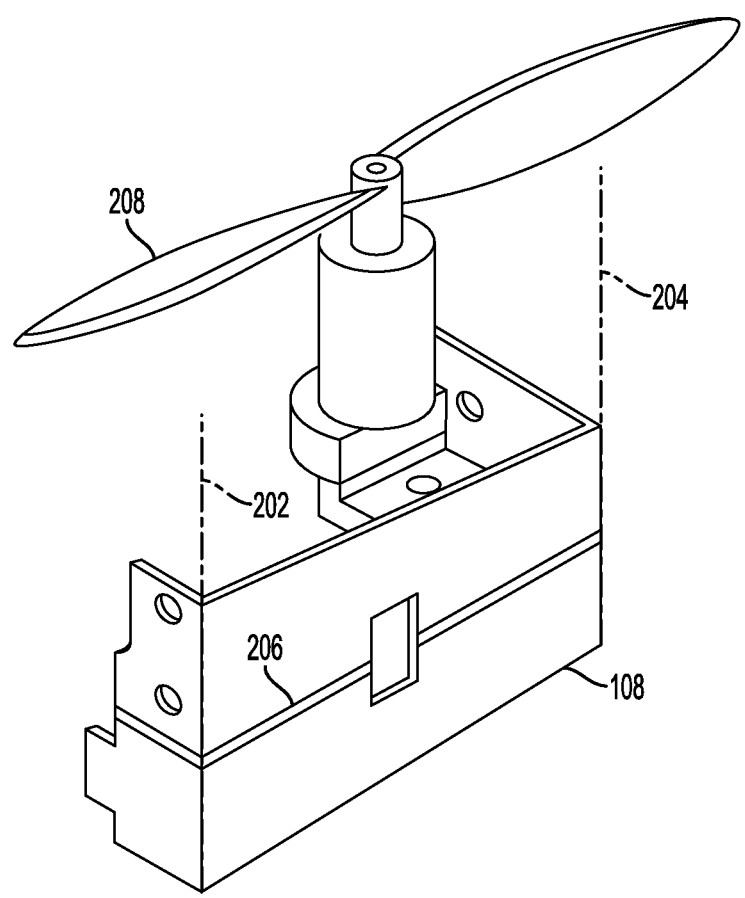
FIG. 2A illustrates a wrapped configuration of an arm according to various embodiments of the present disclosure.
Figure 2B:
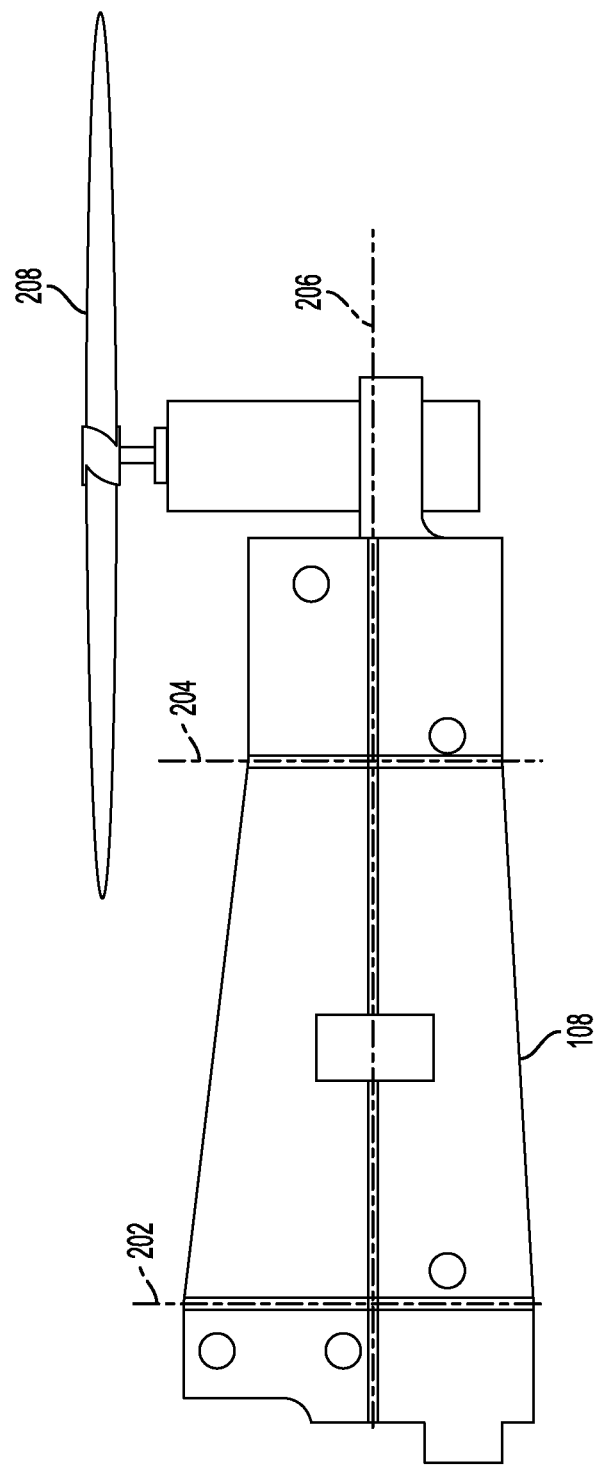
FIG. 2B illustrates an unwrapped and flat configuration of an arm according to various embodiments of the present disclosure.
Figure 2C:
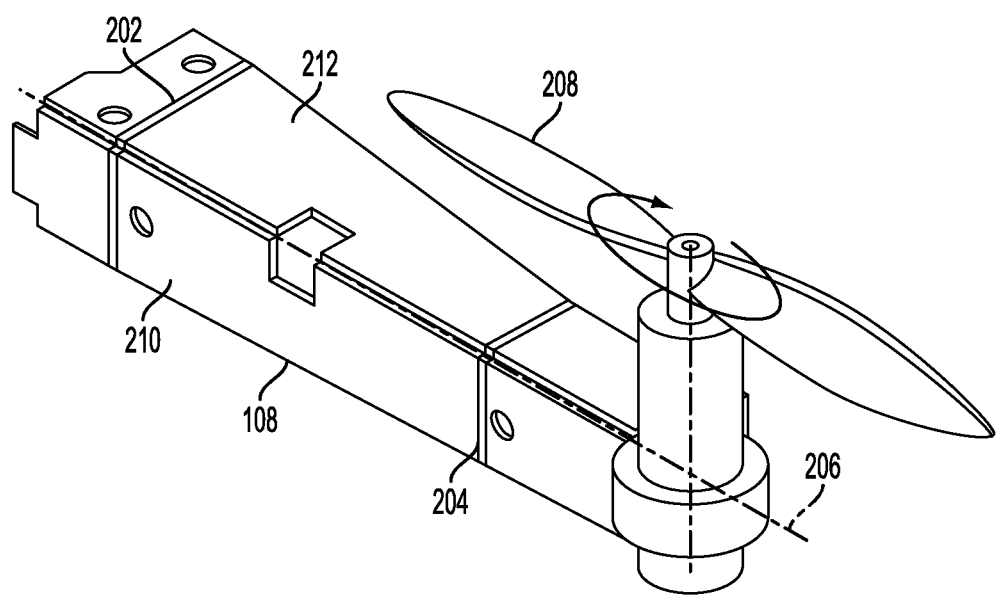
FIG. 2C illustrates an unwrapped and deployed configuration of an arm according to various embodiments of the present disclosure.

According to an aspect of the present disclosure, varying configurations of an arm 108 are described with reference to FIGS. 2A-2C. The arm 108 may include various fold lines, including vertical fold lines 202 and 204 and a horizontal fold line 206. It should be appreciated that the arm 108 may contain more or less fold lines and with different layout than those illustrated without departing from the scope of the present disclosure. The fold lines 202, 204, and 206 within the arm 108 allow a user to simply toss an aerial vehicle, which may be similar to the aerial vehicle 100 described above, into the air for a rapid self or autonomous deployment. As illustrated, the arm 108 may have a 2D trapezoidal shape when in the flat configuration. The arm 108 may transition between the wrapped configuration and the flat configuration by unfolding along the vertical fold lines 202 and 204, which are parallel with an axis of the propeller 208. The arm 108 may also transition between the flat configuration and the deployed configuration by folding along the horizontal fold line 206, which is perpendicular to the axis of the propeller 208. This may result in the arm 108 having an "L" cross section, formed by two perpendicular or substantially perpendicular portions (i.e., one portion 210 parallel with the axis of the propeller 208 and one portion 212 perpendicular with the axis of the propeller 208). This allows for minimal bending of the arm 108 to occur during flight of the aerial vehicle. Accordingly, the portion 210 parallel with the propeller's 208 axis may withstand bending and shear stress generated by thrust of the propeller 208 and the portion 212 perpendicular to the propeller's 208 axis may lock the arm 108 in its deployed configuration, thereby preventing instability and withstanding the momentum associated with the torque produced by the propeller 208. As described, the transition from the wrapped configuration to the deployed configuration may require passing through the flat configuration. It should be appreciated that the arm 108 may be folded in other configurations than the one illustrated ("L cross section") without departing from the scope of the present disclosure.

In an embodiment, the arm 108 may have housings or recesses cut into the arm 108. Magnets may be inserted or otherwise formed into the housing to keep the arm 108 wrapped while in the wrapped configuration and to automatically fold the arm 108 along the horizontal fold line 206, thereby assisting in the movement of the arm 108 from the flat configuration to the deployed configuration.

Figure 3B:
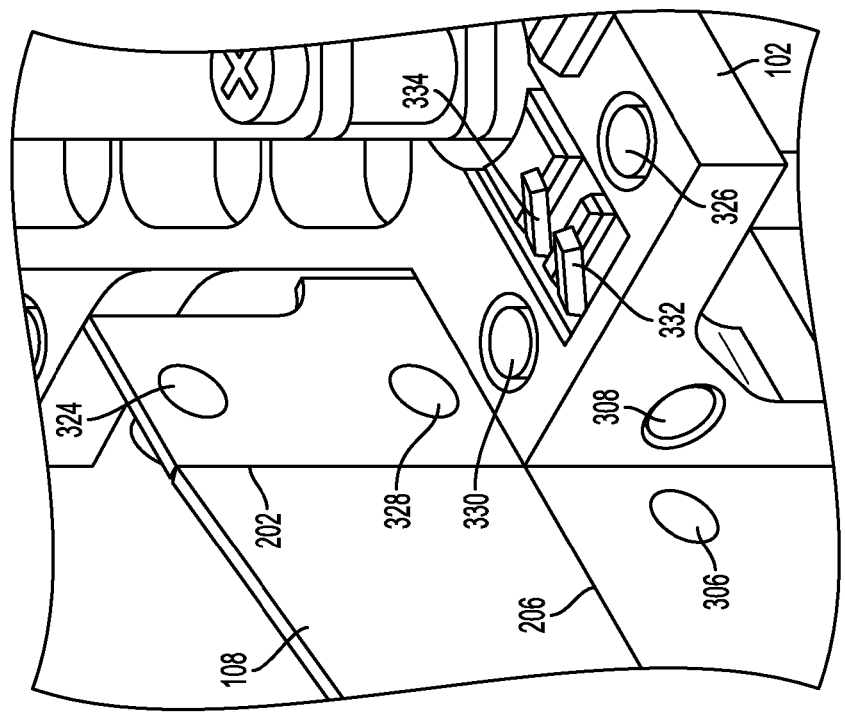
FIGS. 3A and 3B illustrate magnets and switches embedded in the vehicle according to the disclosure.
Figure 3A:
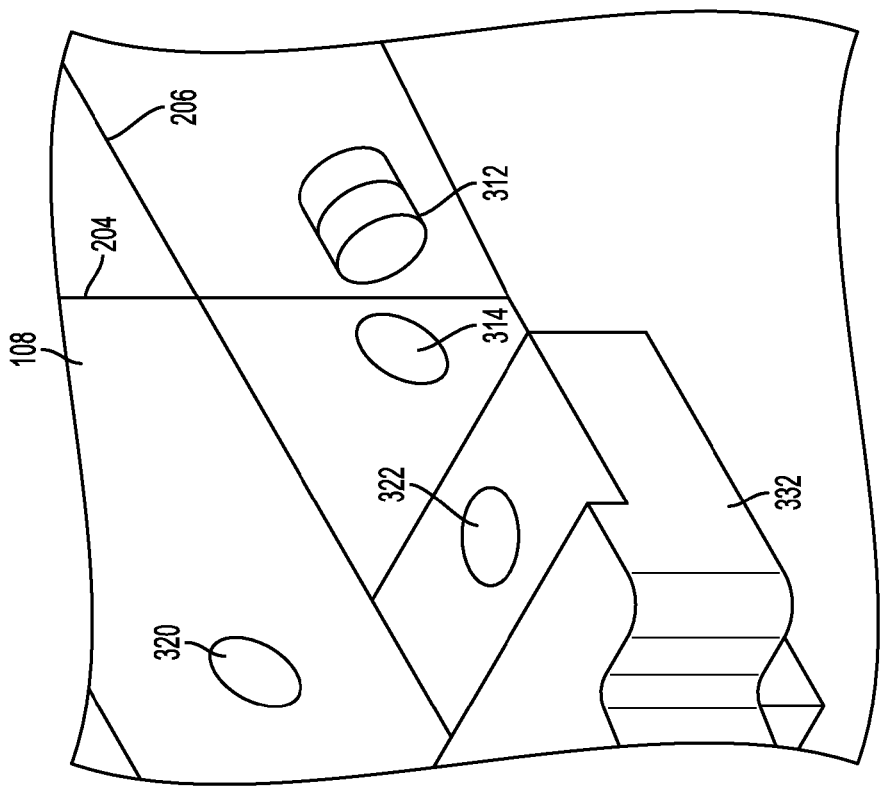
Figure 3C:
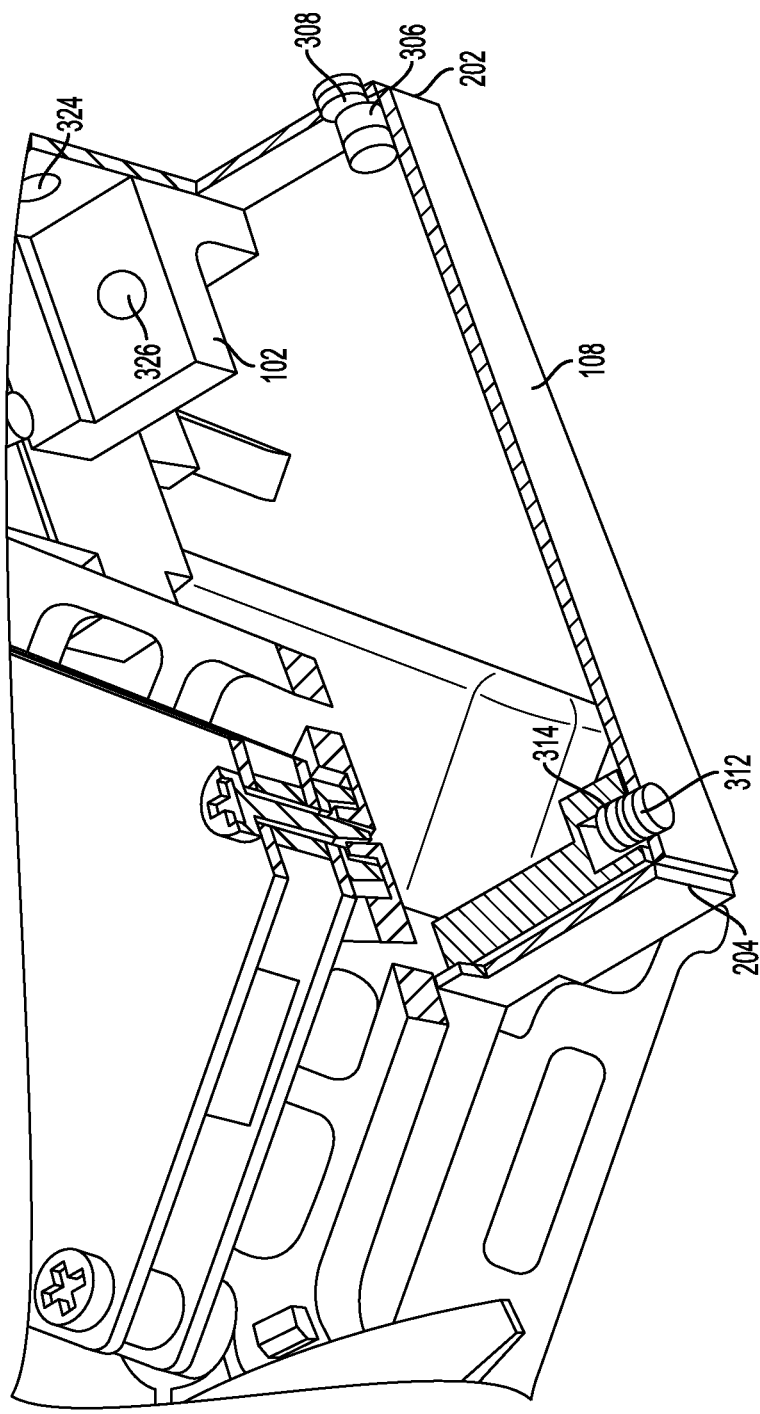
FIG. 3C illustrates a partial sectional view, taken along line AA of FIG. 1A, showing magnets used to maintain the arm in wrapped configuration during transportation.

As illustrated in FIGS. 3A-3C, various embodiments may include an arm 108 and a main frame 102 having integrated magnets that maintain the arm 108 in a wrapped configuration during transportation of the aerial vehicle. A first couple of magnets 306 and 308 may be embedded or disposed upon the arm 108 and the main frame 102, thereby generating a torque that causes the arm 108 to wrap about a vertical fold line 202 located proximate the main frame 102. A second couple of magnets 312 and 314 may be embedded or disposed upon the arm 108, thereby generating a torque that causes the arm 108 to wrap about a vertical fold line 204 located proximate a motor attached to the arm 108. At least one magnet within each of the first and second couple of magnets, may be embedded within housings cut in the arm 108 (e.g., illustrated magnets 306 and 314).

As the arm 108 is deployed, the arm goes from the wrapped configuration to the flat configuration whereby the magnets 306 and 312 are disengaged from the magnets 308 and 314 respectively (as a function of torque applied by the rotation of the motors/propellers), thereby resulting in the arm 108 being unwrapped and unfolded about the vertical fold lines 202 and 204 until the arm achieves the flat configuration. Thus, during deployment of the arm 108, the propellers are engaged to generate torque sufficient to overcome the attraction forces of the first and second couples of magnets 306, 308, 312, and 314. In an illustrative embodiment, the distance between the first and second couples of magnets 306, 308, 312, and 314 from the vertical fold lines 202 and 204 may be, for example, about 1.5 mm. It should be appreciated that while magnets are disclosed, other mechanical and/or electro-mechanical devices may be implemented to position and retain the arm(s) in the wrapped configuration prior to deployment, such as pre-loaded elastic elements, electropermanent magnets or reversible mechanical locking devices.

In another part of the deployment process, the arm 108 may fold about a horizontal fold line 206, thereby orienting the arm 108 into the deployed configuration. This folding about the horizontal fold line 206 may be driven by forces or torque generated by multiple couples of magnets 320, 322, 324, 326, 328, and 330, or other mechanical and/or electro-mechanical devices, which may be embedded within the arm 108, the main frame 102, and/or a motor holding 332 attached to the arm 108 distal from the main frame 102. When folding about the horizontal fold line 206, the magnets 320, 324, and 328 may interact with the magnets 322, 326, and 330 respectively. In an embodiment, a single couple of magnets (e.g., magnets 324 and 326) may be located at or proximate the main frame 102. In other embodiments, more than one couple of magnets (e.g., magnets 324, 326, 328, and 330) may be located at or proximate the main frame 102.

In an embodiment, the magnets may be cylindrical magnets, such as neodymium N48, with axial magnetization, for example. In an embodiment, each of the magnets in a couple may have a diameter of about 2 mm. In a further embodiment, one magnet in a couple may have a thickness of about 2 mm and the other magnet in the couple may have a thickness of about 1 mm. Additionally, the magnets within a couple may be configured to have a maximum attraction force of about 0.62 N. However, it should be appreciated that the number or magnets, the thickness and diameter of each magnet and the attractive (or repulsive) forces and the shape of the magnets may be the same, or different from what is described herein, without departing from the scope of the present disclosure.

Additionally, the main frame 102 may include integrated switches 332 and 334 that signal when the arm 108 has achieved the deployed configuration, thereby allowing or causing the rotation direction of the diagonally opposing motors to revert. In an embodiment, a single switch may be integrated proximate an arm 108. In other embodiments, more than one switch may be integrated proximate an arm 108. Prior to achieving the deployed configuration, the arm 108 does not engage the switches 332 and 334, thereby resulting in the switches 332 and 334 having an open configuration. When the arm 108 has achieved the deployed configuration, the arm 108 may engage the switches 332 and 334, upon folding about the horizontal fold line 206, thereby causing the switches 332 and 334 to have a closed configuration.

A flight condition for a quadrotor aerial vehicle requires two motors diagonally opposed to rotate in one direction (e.g., clockwise) and the two other motors to rotate in an opposite direction (e.g., counterclockwise), thereby ensuring the aerial vehicle is balanced about the yaw axis. However, during the herein described deployment process, all four motors rotate in a single direction (e.g., counterclockwise), thereby causing sufficient torque to overcome the attraction forces of the first and second couples of magnets 306, 308, 312, and 314, therefore ensuring the transition from the wrapped to the flat configuration. Thus, the switches 332 and 334 may be integrated on the main frame 102 at or proximate diagonally opposed arms 108. The switches 332 and 334 may be connected to a dedicated electronic board designed to revert the rotation direction of the diagonally opposed motors, depending on the configuration of the switches 332 and 334. Thus, all motors of the aerial vehicle are allowed to rotate in a single direction (e.g., counterclockwise) when the switches 332 and 334 are in the open configuration and, upon the switches 332 and 334 having a closed configuration caused by interaction with the arms 108, the rotation direction of two diagonally opposed motors is reverted (e.g., to clockwise) while the motors attached to the arms 108 that do not interact with the switches 332 and 334 remain in the original rotation direction (e.g., counterclockwise). Such reversion of the motor rotation may occur in less than 50 milliseconds, for example. Further, according to multiple embodiments, all arms of the aerial vehicle may transition between configurations at the same rate or each arm may transition between configurations at varying rates.

According to an embodiment, the transition of the arm from the deployed configuration to the wrapped configuration may require the manual labor of a user. However, in another embodiment, the transition of the arm from the deployed configuration to the wrapped configuration may occur without direct user interaction. This may involve generating opposite torque of that used to transition the arm 108 from the wrapped configuration to the deployed configuration.

Figure 4A:
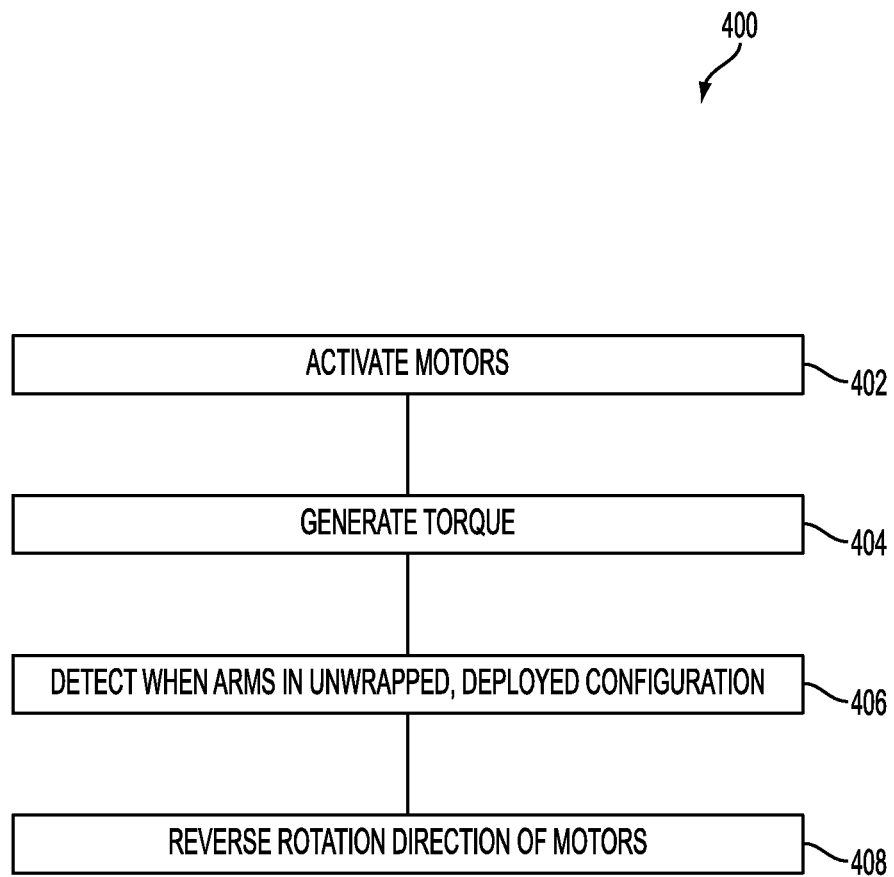
FIG. 4A illustrates a process flow diagram for deploying an aerial vehicle according to various embodiments of the present disclosure.

According to another aspect of the present disclosure, a method 400 of deploying an aerial vehicle is described with reference to FIG. 4A. At block 402 the motors of the aerial vehicle are activated. At block 404 a torque is generated by propellers of the aerial vehicle. This torque may thereby cause the arms of the aerial vehicle to transition from the wrapped configuration to the flat configuration. Such unwrapping of the arms may occur along one or more vertical fold lines located on each arm. In an embodiment, all of the propellers of the aerial vehicle may be rotated in a counterclockwise rotation, thereby generating a clockwise torque. However, it should be appreciated that the propellers may be rotated in a clockwise rotation to generate a counterclockwise torque without departing from the scope of the present disclosure. The torque generated by magnets located on each arm, may transition each arm from the flat configuration to the deployed configuration. Such transition from the flat to the deployed configuration may involve folding each arm along one or more horizontal fold lines located on each arm.

At block 406 it is detected when all of the arms have achieved the deployed configuration. This may include the use of one or more switches or indicators (for example optical, electro-optical, magnetic, capacitive indicators, embedded within or on the main frame proximate two diagonally opposing arms, which may indicate when the arms are in the wrapped and flat configurations and when the arms are in the deployed configuration. At block 408 the rotation direction of diagonally opposing motors, and thereby the rotation direction of the propellers in communication with the diagonally opposing motors, is reversed. This may include the use of a dedicated electronic board, in communication with the switches and motors, that changes the direction of rotation of the motors depending on the configuration of the switches. Again, it should be appreciated that mechanical switches may be replaced or supplemented by other devices, such as solid state switches or other optical, electro-optical or mechanical or electro-mechanical or magnetic or capacitive devices.

Figure 4B:
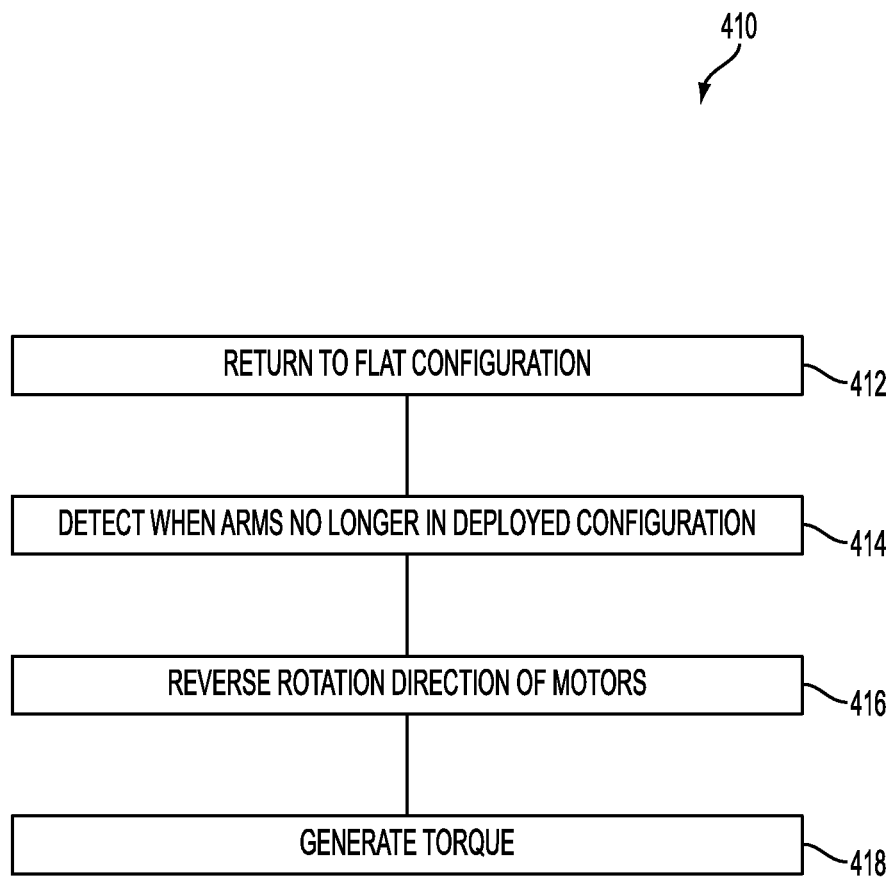
FIG. 4B illustrates a process flow diagram for undeploying or wrapping an aerial vehicle according to various embodiments of the present disclosure.

According to a further aspect of the present disclosure, a method 410 of undeploying or wrapping an aerial vehicle is described with reference to FIG. 4B. At block 412 the arm is returned to its flat configuration, such as by overcoming the attraction forces of the magnets causing the arms to fold about the horizontal fold line. This may be performed manually or in automatic fashion in accordance with the disclosure. At block 414 it is detected when the arms no longer achieve the deployed configuration. This may include the use of one or more switches or sensors embedded or disposed in or on the main frame at or proximate to diagonally opposing arms/motors, which may be closed when the arms are in the deployed configuration and open when the arms are not in the deployed configuration. At block 416, the rotation direction of the two diagonally opposing motors are reversed. This may include the use of a dedicated electronic board, in communication with the switches and motors, that changes the direction of rotation of the two diagonally opposing motors depending on the configuration of the switches. At block 418, torque, opposite of the torque generated at block 404 during deployment, is generated to wrap the arms around the main frame.

Figure 5B:
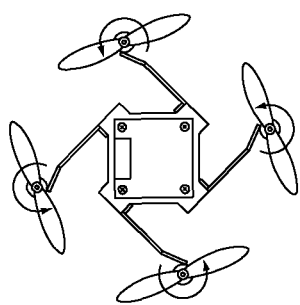
FIGS. 5A-5D illustrate a pictorial flow diagram of a deployment of an aerial vehicle according to various embodiments of the present disclosure.
Figure 5C:
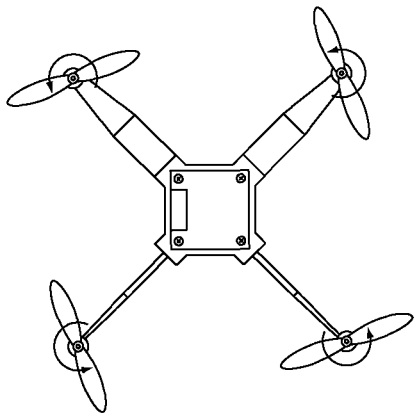
Figure 5A:
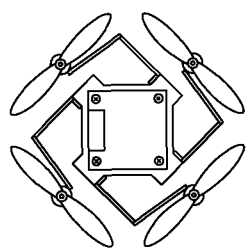
Figure 5D:
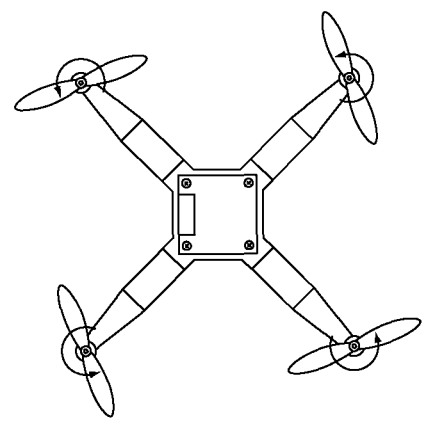

For the purpose of further illustration, the herein described deployment process (i.e., from the wrapped configuration to the deployed configuration) is pictorially illustrated in FIGS. 5A-5D. FIG. 5A illustrates the quadrotor according to the disclosure in a full wrapped configuration. FIG. 5B illustrates the quadrotor according to the disclosure in a partially unwrapped state. FIG. 5C illustrates the quadrotor according to the disclosure in a partially deployed state, with at least some of the arms in a flat configuration. FIG. 5D illustrates the quadrotor according to the disclosure in a full deployed configuration.

Although the aforementioned disclosure relates to an aerial vehicle having four arms and four propellers, i.e., a quadrotor, it should be appreciated that an aerial vehicle having any number of arms and propellers may be capable of the aforementioned qualities, characteristics, and functions herein described.

While embodiments with horizontal and vertical folds are described, and with a particular number of each of the respective folds, it should be appreciated that folds may be implemented in alternative configurations so that arms fold/unfold-deploy compatible with the direction of rotation and/or as a function of torque provided by each, or a respective, propeller. For example, in addition or as an alternative to the L section of the arm as described, an arm with more horizontal folds could be implemented that can achieve a triangular (2 horizontal folds) or a square section (3 horizontal folds).

Further, it should also be appreciated that a greater or lesser number of folds may be implemented to effect any of various wrapped and unwrapped configurations. Similarly, thrust of a propeller may be used to fold/deploy an arm in a manner that implements other than horizontal and/or vertical folds.

While the systems and methods disclosed herein have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

What is claimed is:

1. An aerial vehicle comprising:
   a main frame;
   arms attached to the main frame and having a wrapped configuration, a flat configuration, and a deployed configuration;
   motors attached to the arms;
   propellers in working communication with the motors, the propellers generating a torque that transitions the arms from the wrapped configuration to the flat configuration; and
   magnets attached to the main frame and arms, the magnets having attraction forces that transition the arms from the flat configuration to the deployed configuration.

2. The aerial vehicle of claim 1 further comprising:
   a set of magnets attached to the main frame and arms, the set of magnets having attraction forces that hold the arms in the wrapped configuration.

3. The aerial vehicle of claim 1 wherein each of the arms include at least one horizontal fold line.

4. The aerial vehicle of claim 1 further comprising:
   switches attached to the main frame, the switches indicating when the arms are in the deployed configuration.

5. The aerial vehicle of claim 1 wherein the arms include two substantially perpendicular portions when in the folded configuration.

6. The aerial vehicle of claim 1 wherein each of the arms include at least one vertical fold line.

7. The aerial vehicle of claim 6 wherein each of the arms include two vertical fold lines.

8. The aerial vehicle of claim 7 wherein each of the arms are folded along each of the two vertical fold lines when in the wrapped configuration.

9. An arm of an aerial vehicle comprising:
   a first portion oriented parallel with an axis of a propeller;
   a second portion oriented parallel with the axis of the propeller when the arm is in a flat configuration and oriented perpendicular with the axis of the propeller when the arm is in a deployed configuration;
   a first device attached to the arm to hold the arm in a wrapped configuration; and
   a second device attached to the arm to transition the arm from the flat configuration to the deployed configuration.

10. The arm of claim 9 further comprising:
    at least one fold line oriented parallel with the axis of the propeller.

11. The arm of claim 9 further comprising:
    at least one fold line oriented substantially perpendicular with the axis of the propeller.

12. The arm of claim 9 wherein at least one of the first and second devices are magnets.

13. The arm of claim 12 wherein at least one magnet is located on the second portion of the arm proximate a main frame of the aerial vehicle, the at least one magnet interacting with at least one magnet attached to the main frame, thereby transitioning the arm from the flat configuration to the deployed configuration.

14. A method of deploying an aerial vehicle comprising the steps of:
    activating motors located on arms of the aerial vehicle;
    generating torque through propellers by rotating the propellers in a first direction;
    detecting when the arms have achieved a deployed configuration; and
    inverting a rotation of a portion of the propellers thereby causing the portion of the propellers to rotate in a second direction.

15. The method of claim 14 wherein the generating step includes rotating the propellers in a counterclockwise direction.

16. The method of claim 14 wherein the inverting step includes causing the portion of the propellers to rotate in a clockwise direction.

17. The method of claim 14 wherein the detecting step includes detecting when each of the arms, individually, has achieved the folded configuration and the inverting step includes inverting the rotation of the portion of the propellers, individually, when the arms in communication with the portion of the propellers individually achieve the deployed configuration.

18. The method of claim 14 wherein the detecting step includes using switches to detect when the arms have achieved the deployed configuration.

19. The method of claim 18 wherein the detecting step includes detecting when the switches are in a closed position.

20. The method of claim 19 wherein the inverting step includes inverting the rotation of the portion of the propellers upon receiving a signal indicating the switches are in the closed position.

* * * * *